(12) United States Patent
Nowak et al.

(10) Patent No.: US 9,036,251 B2
(45) Date of Patent: May 19, 2015

(54) SLAB AMPLIFICATION DEVICE, LASER APPARATUS, AND EXTREME ULTRAVIOLET LIGHT GENERATION SYSTEM

(75) Inventors: Krzysztof Nowak, Oyama (JP); Takashi Suganuma, Oyama (JP); Osamu Wakabayashi, Hiratsuka (JP)

(73) Assignee: GIGAPHOTON INC., Tochigi (JP)

( * ) Notice: Subject to any disclaimer, the term of this patent is extended or adjusted under 35 U.S.C. 154(b) by 204 days.

(21) Appl. No.: 13/642,464

(22) PCT Filed: Nov. 10, 2011

(86) PCT No.: PCT/IB2011/002663
§ 371 (c)(1),
(2), (4) Date: Oct. 19, 2012

(87) PCT Pub. No.: WO2012/066402
PCT Pub. Date: May 24, 2012

(65) Prior Publication Data
US 2013/0034116 A1    Feb. 7, 2013

(30) Foreign Application Priority Data
Nov. 17, 2010    (JP) ................. 2010-257332

(51) Int. Cl.
*H01S 4/00*     (2006.01)
*H01S 3/10*     (2006.01)
*H01S 3/23*     (2006.01)
*H05G 2/00*     (2006.01)
*H01S 3/00*     (2006.01)
*H01S 3/03*     (2006.01)

(52) U.S. Cl.
CPC ............ *H01S 3/2366* (2013.01); *H05G 2/008* (2013.01); *H01S 3/2375* (2013.01); *H01S 3/005* (2013.01); *H01S 3/0315* (2013.01)

(58) Field of Classification Search
USPC ................. 359/333, 337, 346; 372/9
See application file for complete search history.

(56) References Cited

U.S. PATENT DOCUMENTS

| 4,264,868 | A | 4/1981 | Leland et al. |
| 5,241,551 | A | 8/1993 | Chernoch et al. |
| 7,903,715 | B2 * | 3/2011 | Nowak et al. ............... 372/55 |

(Continued)

FOREIGN PATENT DOCUMENTS

| JP | 2008-177608 A | 7/2008 |
| WO | WO-01/86767 A1 | 11/2001 |

OTHER PUBLICATIONS

International Search Report mailed Jul. 5, 2012 issued in corresponding International Application No. PCT/IB2011/002663.

(Continued)

*Primary Examiner* — Eric Bolda
(74) *Attorney, Agent, or Firm* — McDermott Will & Emery LLP

(57) ABSTRACT

An EUV light generation system includes a driver laser comprising a master oscillator such as a semiconductor laser, a spatial filter, gas slab amplification devices, relay optical systems, and high-speed axial-flow amplifiers. The slab amplification devices include beam adjusting optical units disposed, respectively, at input and output sides of the slab amplifiers SA to convert the beam profile and/or polarization direction and/or an elongated direction of the beam profile with the slab amplifiers is parallel to a free space axis AF of the slab waveguides, i.e. parallel to the discharge electrodes.

8 Claims, 13 Drawing Sheets

(56) References Cited

U.S. PATENT DOCUMENTS

| | | |
|---|---|---|
| 2002/0167974 A1 | 11/2002 | Kennedy et al. |
| 2003/0138021 A1* | 7/2003 | Hodgson et al. ............... 372/75 |
| 2005/0220164 A1* | 10/2005 | Mori et al. ..................... 372/92 |
| 2010/0078577 A1 | 4/2010 | Moriya et al. |
| 2010/0078580 A1* | 4/2010 | Endo et al. ............... 250/504 R |
| 2010/0195196 A1 | 8/2010 | Nowak et al. |

OTHER PUBLICATIONS

International Preliminary Report on Patentability (PCT/IB/373) issued in International Application PCT/IB2011/002663 dated May 30, 2013.

Written Opinion (PCT/ISA/237) issued in International Application PCT/IB2011/002663 dated Jul. 5, 2012.

Japanese Office Action issued in Japanese Application No. 2010-257332 dated May 7, 2014, w/English translation.

* cited by examiner

SLAB AMPLIFICATION DEVICE, LASER APPARATUS, AND EXTREME ULTRAVIOLET LIGHT GENERATION SYSTEM

CROSS-REFERENCE TO RELATED APPLICATIONS

The application claims priority of Japanese Patent Application No. 2010-257332 filed Nov. 17, 2010, the entire contents of which are hereby incorporated by reference.

BACKGROUND

1. Technical Field

This disclosure relates to a slab amplification device, a laser apparatus including the slab amplification device, and an extreme ultraviolet light generation system including the laser apparatus.

2. Related Art

Photolithography processes have been continuously improving for semiconductor device fabrication. Extreme ultraviolet (EUV) light at a wavelength of approximately 13 nm is useful in the photolithography processes to form extremely small features (e.g., 32 nm or less features) in, for example, semiconductor wafers.

Three types of system for generating EUV light have been well known. The systems include an LPP (Laser Produced Plasma) type system in which plasma generated by irradiating a target material with a laser beam is used, a DPP (Discharge Produced Plasma) type system in which plasma generated by electric discharge is used, and an SR (Synchrotron Radiation) type system in which orbital radiation is used.

SUMMARY

A slab amplification device according to one aspect of this disclosure may include: at least one slab amplifier; and at least one beam adjusting optical unit disposed at least either one of an input side and an output side of the at least one slab amplifier.

A laser apparatus according to another aspect of this disclosure may include: a master oscillator; the above slab amplification devices, to which a laser beam outputted from the master oscillator is inputted; and an amplifier for amplifying the laser beam outputted from the slab amplification device.

An extreme ultraviolet light generation system according to yet another aspect of this disclosure may include the above laser apparatus.

DESCRIPTION OF THE EMBODIMENTS

Figure 1:
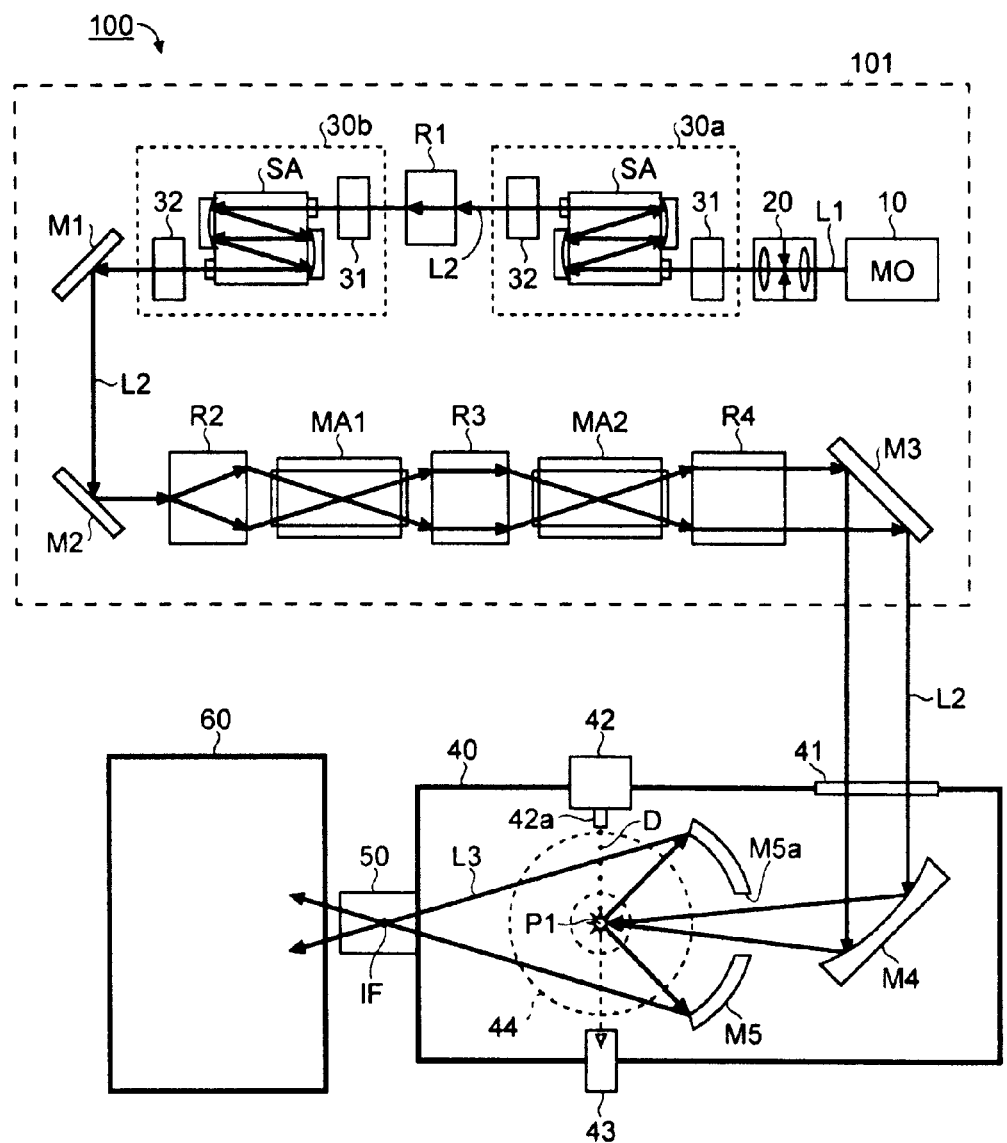
FIG. 1 illustrates an EUV light generation system according to a first embodiment.

Hereinafter, selected embodiments for implementing this disclosure will be described in detail with reference to the accompanying drawings. In the description to follow and the accompanying drawings, each drawing merely illustrates shape, size, positional relationship, and so on, schematically to the extent that enables the content of this disclosure to be understood; thus, this disclosure is not limited to the shape, the size, the positional relationship, and so on, illustrated in each drawing. In order to show the configuration clearly, part of hatching along a section may be omitted in the drawings. Further, numerical values indicated herein are merely preferred examples of this disclosure; thus, this disclosure is not limited to the indicated numerical values.

First Embodiment

Hereinafter, a first embodiment of this disclosure will be described in detail with reference to the drawings. FIG. 1 illustrates an EUV light generation system according to the first embodiment. An EUV light generation system 100 may include a driver laser 101, a chamber 40, and a laser beam focusing optical element (off-axis parabolic mirror M4, for example) for focusing a laser beam L2 outputted from the driver laser 101 in a plasma generation region P1 defined inside the chamber 40. Further, an exposure apparatus connection 50 may be provided between the chamber 60 and an exposure apparatus 60.

The driver laser 101 may include a master oscillator 10, a spatial filter 20, first and second slab amplification devices 30a and 30b, a relay optical system R1, high-reflection mirrors M1 and M2, relay optical systems R2 through R4, first and second high-speed axial-flow amplifiers MA1 and MA2, and a high-reflection mirror M3.

The master oscillator 10 may be a semiconductor laser, such as a quantum cascade laser, a distributed-feedback semiconductor laser, or the like. However, without being limited thereto, various laser devices capable of outputting a laser beam as a seed beam may be used. Since a laser beam L1 outputted from the master oscillator 10 passes through the spatial filter 20 including a combination of a lens and a partition wall having an aperture, for example, interference or the like of the laser beam L1 can be suppressed.

The laser beam L1 having passed through the spatial filter 20 may be amplified while passing through the first and second slab amplification devices 30a and 30b. The amplified laser beam may be referenced as the laser beam L2 herein. The relay optical system R1 may be disposed between the first and second amplifiers 30a and 30b so as to expand the laser beam L2 in diameter. The relay optical system R1 may be configured to adjust the divergence angle, the beam profile, and so forth, of the laser beam L2 outputted from the first slab amplification device 30a. Accordingly, the laser beam L2 may be amplified efficiently in the second slab amplification device 30b.

The laser beam L2 outputted from the second slab amplification device 30b may be reflected by the high-reflection mirrors M1 and M2, respectively, and then be incident on the relay optical system R2. The relay optical system R2 may expand the laser beam L2 in diameter. The laser beam L2 expanded in diameter may pass through almost an entire amplification region of the first high-speed axial-flow amplifier MA1. With this, the laser beam L2 may be provided with energy in the amplification region of the first high-speed axial-flow amplifier MA1 efficiently. The laser beam L2 outputted from the first high-speed axial-flow amplifier MA1 may be collimated in the relay optical system R3, and then enter the second high-speed axial-flow amplifier MA2. The laser beam L2 outputted from the relay optical system R3 may be maintained in a state in which the beam diameter thereof is expanded. Thus, the laser beam L2 may pass through almost an entire amplification region of the second high-speed axial-flow amplifier MA2. With this, the laser beam L2 may be provided with energy in the amplification region of the second high-speed axial-flow amplifier MA2 efficiently.

The laser beam L2 outputted from the second high-speed axial-flow amplifier MA2 may be collimated in the relay optical system R4, and then be reflected by the high-reflection mirror M3. In this way, the high-power laser beam L2 may be outputted from the driver laser 101.

The laser beam L2 outputted from the driver laser 101 may be reflected by the off-axis parabolic mirror M4 to thereby be focused on the plasma generation region P1 defined inside the chamber 40. The off-axis parabolic mirror M4 may be disposed either inside or outside the chamber 40.

The chamber 40 may include a window 41, a droplet generator 42, a target collection unit 43, and an EUV collector optical element (EUV collector mirror M5), for example. The laser beam L2 outputted from the driver laser 101 may travel through the window 41.

The droplet generator 42 may be configured to output, through a nozzle 42a, the molten target material in the form of droplets D. The droplets D may be outputted toward the plasma generation region P1. The laser beam L2 may be focused on the plasma generation region P1 in synchronization with timing at which the droplet D arrives at the plasma generation region P1. The laser beam L2 may travel through a through-hole M5a formed axially at substantially the center of the EUV collector mirror M5 and be focused on the droplet D.

When the droplet D is irradiated with the focused laser beam L2, the target material constituting the droplet D may be ionized in part or in its entirety, to thereby be turned into plasma. When this plasma is deexcited, rays of light including EUV light L3 at a wavelength of approximately 13.5 nm, for example, may be emitted. The EUV collector mirror M5 may selectively reflect, of light emitted from the plasma, the EUV light L3. The reflected EUV light L3 may be focused on an intermediate focus IF defined in the exposure apparatus connection 50 outside the chamber 40, and then be inputted to the exposure apparatus 60. Alternatively, the EUV light L3 may be inputted into another processing apparatus (not shown).

Droplets D that have not be turned into plasma or the remain of the droplets D may be collected by the target collection unit 43. The target collection unit 43 may be disposed inside the chamber 40 so as to face the nozzle 42 through the plasma generation region P1.

In addition, the chamber 40 may be provided with at least one electromagnetic coil 44 for generating a magnetic field around the plasma generation region P1. A charged material (particulates, ions, and the like) of the target material generated around the plasma generation region P1 may be trapped in the magnetic field generated with the electromagnetic coil 44. This can generate an ion flow traveling in a predetermined direction. Disposing a collection unit downstream of this ion flow may allow debris of the target material to be collected relatively easily.

Slab Amplification Device

Figure 2:
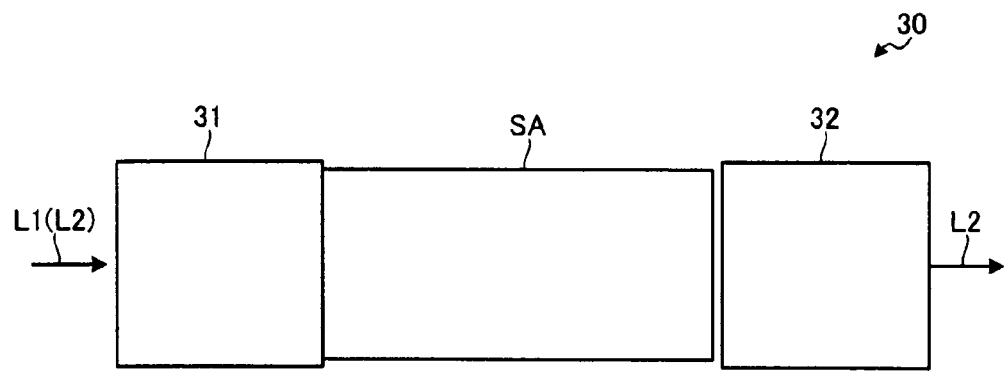
FIG. 2 schematically illustrates a slab amplification device according to the first embodiment.

The slab amplification devices 30a and 30b according to the first embodiment will be described in detail with reference to the drawings. In the description to follow, when a configuration common to both the slab amplification devices 30a and 30b is described, the slab amplification device will be referenced by the reference numeral 30. FIG. 2 schematically illustrates the configuration of the slab amplification device. The slab amplification device 30 may include beam adjusting optical units 31 and 32 disposed, respectively, at input and output sides thereof, and a slab amplifier SA.

Slab Amplifier

Figure 3:
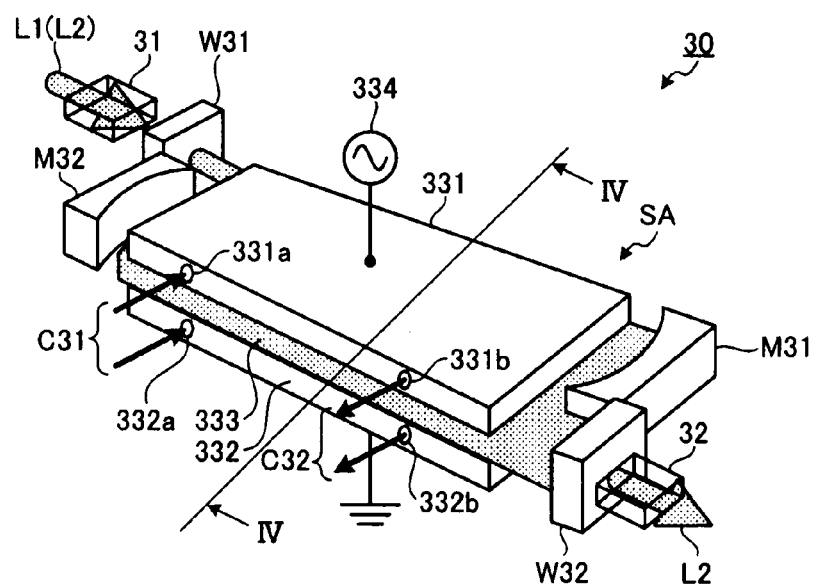
FIG. 3 schematically illustrates a slab amplifier shown in FIG. 2.

FIG. 3 schematically illustrates the configuration of the slab amplifier shown in FIG. 2. In FIG. 3, an outer housing (airtight container) of the slab amplifier SA is omitted in order to show the internal configuration thereof. As illustrated in FIG. 3, the slab amplifier SA may include an input-side window W31, two discharge electrodes 331 and 332 disposed to face each other, two concave spherical mirrors M31 and M32, and an output-side window W32. One discharge electrode 332 may be grounded, for example, and an AC RF potential may be applied to the other discharge electrode 331 by an AC power source 334. A space between the two discharge electrodes may be filled with a gaseous gain medium, and application of voltage between the discharge electrodes may cause a discharge region 333 to be formed therebetween. The two concave spherical mirrors M31 and M32 may respectively reflect the laser beam L1 (L2), and the reflected laser beam L1 (L2) may travel back and forth across the discharge region 333. The laser beam L1 (L2) may be amplified while traveling across the discharge region 333 and be provided with energy. The laser beam L1 (L2) inputted through the input-side window W31 may be reflected by the two concave spherical mirrors M31 and M32, respectively, be amplified, and then be outputted through the output-side window W32.

The two discharge electrodes 331 and 332 may be provided with flow channels, respectively, through which a cooling medium supplied from a cooling device (not shown) may flow. A cooling medium C31 supplied from the cooling device may flow into the discharge electrodes 331 and 332 through respective inlets 331a and 332a, and take heat from the discharge electrodes 331 and 332 as it passes through the flow channels (not shown) inside the discharge electrodes 331 and 332. Thereafter, the cooling medium C31 may flow out, as waste water C32, through outlets 331b and 332b.

Figure 4:
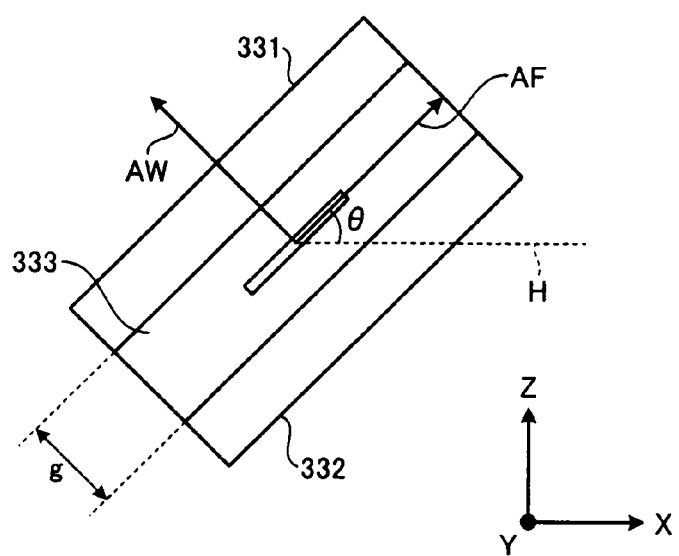
FIG. 4 is a sectional view of the slab amplifier shown in FIG. 3.

In such slab amplifier SA, as illustrated in FIG. 4, for example, a waveguide axis AW (direction of electric field) perpendicular to the discharge electrodes 331 and 332 and a free-space axis (AF) parallel to the discharge electrodes 331 and 332 is defined. In order to improve an amplification efficiency of the slab amplifier SA, the polarization direction of the laser beam may preferably be parallel to the free-space axis AF. A width g of the discharge region in the direction of the waveguide axis AW (size of a gap between the electrodes) may typically be a few millimeters. This, compared to the length of the discharge region 333 in the direction of the free-space axis AF, is extremely short. Accordingly, the polarization direction of the laser beam entering the slab amplifier SA may preferably be parallel to the free-space axis AF, and the beam profile thereof may preferably elongated in the direction of the free-space axis AF.

Figure 5:
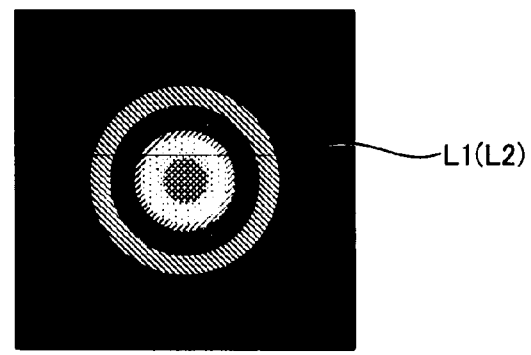
FIG. 5 illustrates an example of a beam profile of a laser beam according to the first embodiment.
Figure 6:
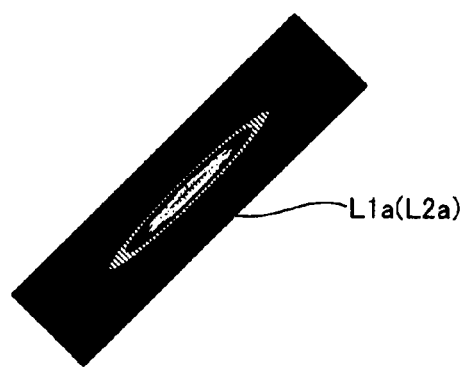
FIG. 6 illustrates an example of a laser beam inputted to the slab amplification device according to the first embodiment.
Figure 7:
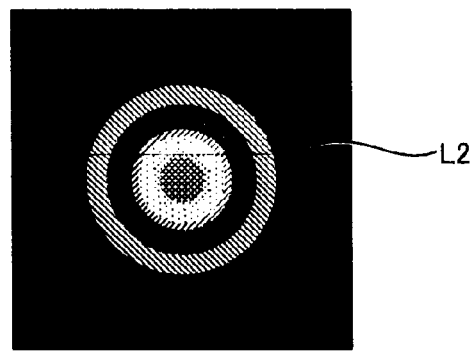
FIG. 7 illustrates an example of a laser beam in the slab amplification device according to the first embodiment.

The slab amplifier SA may be disposed so as to be inclined at a predetermined angle θ (θ=45 degrees, for example) with respect to the horizontal plane (X-Y plane). Even if this is the case, it is preferable that the laser beam enters the inclined slab amplifier SA such that the lengthwise direction of the beam profile thereof coincides with the direction of the free-space axis AF. Accordingly, in the first embodiment, the laser beam L1 (L2) having a circular beam profile, as shown in FIG. 5, may be converted into a laser beam L1a (L2a) having a beam profile elongated in one axial direction, as shown in FIG. 6, using a beam adjusting optical unit to be described later, and the laser beam L1a (L2a) may enter the slab amplifier SA such that the lengthwise direction of the beam profile thereof coincides with the direction of the free-space axis AF of the slab amplifier SA. Subsequently, the laser beam L2a outputted from the slab amplifier SA (See FIG. 6) may be converted back to the laser beam L2 having a circular beam profile, as shown in FIG. 7.

Beam Adjusting Optical Unit

A beam adjusting optical unit shown in FIG. 2 will be described next. A beam adjusting optical unit 31 disposed at the input side of the slab amplifier SA may be configured to convert the beam profile and the polarization direction of the laser beam L1 (L2) inputted to the slab amplifier SA to a beam profile and a polarization direction suitable for the slab amplifier SA. Meanwhile, a beam adjusting optical unit 32 disposed at the output side of the slab amplifier SA may be configured to convert the beam profile and the polarization of the laser beam L2 outputted from the slab amplifier SA to a beam profile and a polarization direction suitable for an amplifier (another slab amplifier SA, high-speed axial-flow amplifiers MA1 and MA2, and so forth, for example), or for an optical system (relay optical systems R1 through R4, for example) disposed downstream thereof. When the beam profile or the polarization direction of the laser beam does not need to be converted, the configurations for carrying out these functions may respectively be omitted. Further, in the description to follow, a downstream-side amplifier or optical system may be referred to as a downstream-side optical unit in some cases.

Figure 8:
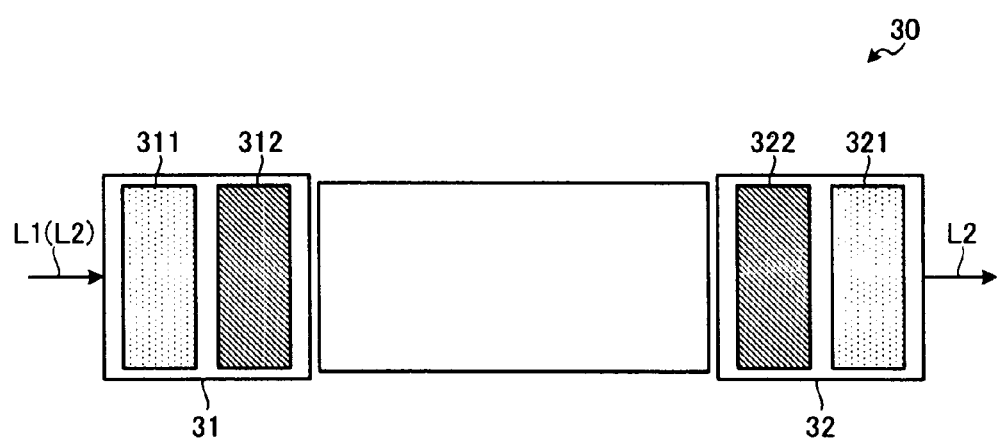
FIG. 8 illustrates an example of a laser beam outputted from the slab amplification device according to the first embodiment.

FIG. 8 schematically illustrates an example of the beam adjusting optical unit. As illustrated in FIG. 8, the beam adjusting optical unit 31 disposed at the input side of the slab amplifier SA may include a polarization direction adjusting optical unit 311 disposed upstream along the direction in which the laser beam L1 travels and a beam shape adjusting optical unit 312 disposed downstream of the polarization direction adjusting optical unit 311. A beam adjusting optical unit 32 disposed at the output side of the slab amplifier SA may include a beam shape adjusting optical unit 322 disposed upstream along the direction in which the laser beam travels and a polarization direction adjusting optical unit 321 disposed downstream of the beam shape adjusting optical unit 322.

The polarization direction adjusting optical unit 311 may be configured to convert the polarization direction of the laser beam L1 (L2) inputted therein to a polarization direction suitable for the slab amplifier SA. The beam shape adjusting optical unit 312 may be configured to convert the beam profile of the laser beam L1 (L2) to a beam profile suitable for the slab amplifier SA. Meanwhile, the beam shape adjusting optical unit 322 may be configured to convert the beam profile of the laser beam L2 outputted from the slab amplifier SA to a beam profile suitable for a downstream-side optical unit or the like. The polarization direction adjusting optical unit 321 may be configured to convert the polarization direction of the laser beam L2, the beam profile of which has been converted, to a polarization direction suitable for a downstream-side optical unit or the like.

Polarization Direction Adjusting Optical Unit

Figure 9:
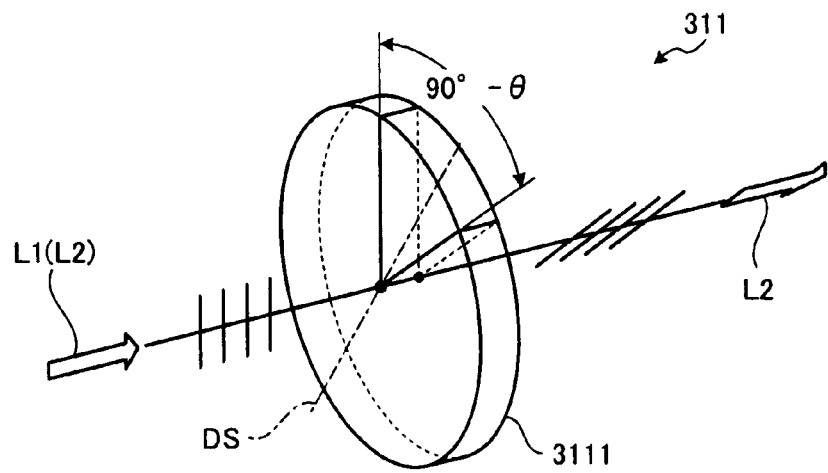
FIG. 9 illustrates an example of a polarization direction adjusting optical unit according to the first embodiment.

FIG. 9 illustrates an example of the polarization direction adjusting optical unit 311. The polarization direction adjusting optical unit 321 may be similar in configuration to the polarization direction adjusting optical unit 311. As illustrated in FIG. 9, the polarization direction adjusting optical unit 311 may include a half-wave plate 3111, for example. The half-wave plate 3111 may preferably be disposed such that a direction DS of the optical axis of the crystal thereof is inclined at (90°−θ)/2 with respect to the polarization direction of the laser beam L1 (L2) incident thereon. In FIG. 9, the laser beam L1 (L2) incident on the crystal may be linearly polarized in the vertical direction. The laser beam L1 (L2), having passed through the half-wave plate 3111, may have the polarization direction thereof be converted by 90°−θ (45 degrees, for example). With this, the polarization direction of the laser beam L1 (L2) may be inclined suitably for the slab amplifier SA inclined by e with respect to the horizontal plane. The half-wave plate 3111 may be either a transmissive type or a reflective type. Since using a reflective type wave plate may make it possible to cool the wave plate from the rear side thereof, the wave plate may be stabilized thermally.

First Modification of Polarization Direction Adjusting Optical Unit

Figure 10:
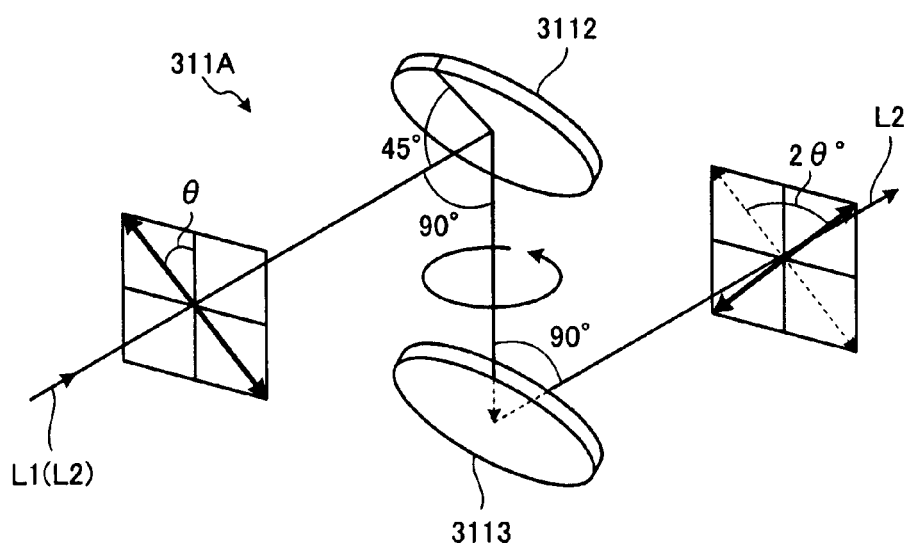
FIG. 10 illustrates a first modification of the polarization direction adjusting optical unit.

FIG. 10 illustrates a first modification of the polarization direction adjusting optical unit 311 (321). As illustrated in FIG. 10, a polarization direction adjusting optical unit 311A may include two quarter-wave plates 3112 and 3113. In this configuration, the linearly polarized laser beam L1 (L2), the polarization direction of which may be inclined by θ with respected to the vertical direction, may be incident on the quarter-wave plate 3112. Accordingly, the laser beam L1 (L2) may be converted into a circularly polarized laser beam and be reflected thereby. Thereafter, the circularly polarized laser beam L1 (L2) may be incident on the quarter-wave plate 3113. Thus, the laser beam L1 (L2) may be converted into a linearly polarized laser beam. The polarization direction of the laser beam is inclined by −θ with respect to the vertical direction. That is, having passed through the two quarter-wave plates 3112 and 3113, the polarization direction of the laser beam L1 (L2) may be rotated by 2θ. With this, the polarization direction of the laser beam L1 (L2) may be inclined suitably for the slab amplifier SA inclined by θ with respect to the horizontal plane. The quarter-wave plates 3112 and 3113 may be either transmissive type or reflective type.

Second Modification of Polarization Direction Adjusting Optical Unit

Figure 11:
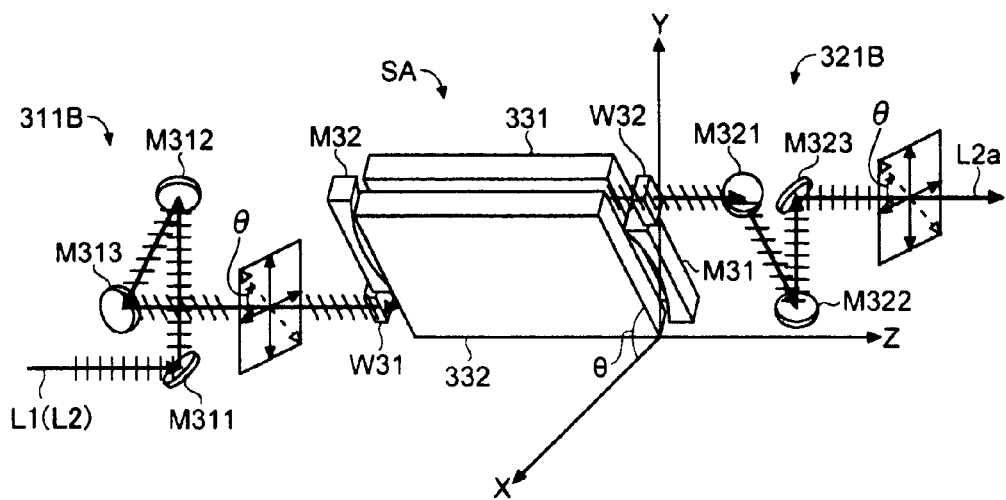
FIG. 11 illustrates a second modification of the polarization direction adjusting optical unit.

FIG. 11 illustrates a second modification of the polarization direction adjusting optical unit 311 (321). As illustrated in FIG. 11, a polarization direction adjusting optical unit 311B in the input-side beam adjusting optical unit 31 may include three high-reflection mirrors M311 through M313. The linearly polarized laser beam L1 (L2), the polarization direction of which may be in the vertical direction (Y direction), is incident on the polarization direction adjusting optical unit 311B in the horizontal direction (Z direction). The high-reflection mirror M311 may reflect the laser beam L1 (L2) incident thereon in the vertical direction (Y direction). With this, the laser beam L1 (L2) may be polarized in the horizontal direction (Z direction). Then, the high-reflection mirror M312 may reflect the laser beam L1 (L2) in the direction of the inclination (θ) of the slab amplifier SA. At this time, the polarization direction of the laser beam L1 (L2) may remain in the horizontal direction (Z direction). Subsequently, the high-reflection mirror M313 may reflect the laser beam L1 (L2) in the horizontal direction (Z direction). As a result, the polarization direction of the laser beam L1 (L2) may coincide with the direction of the inclination (θ) of the slab amplifier SA.

A polarization direction adjusting optical unit 321B in the output-side beam adjusting optical unit 32 may be configured of three high-reflection mirrors M321 through M323. The laser beam L2a outputted from the slab amplifier SA may be reflected by the high-reflection mirror M321, first. The high-reflection mirror M321 may reflect the laser beam L2a in the direction of the inclination (θ) of the slab amplifier SA. At this time, the laser beam L2a may be polarized in the horizontal direction (Z direction). Then, the high-reflection mirror M322 may reflect the laser beam L2a in the vertical direction (Y direction). At this time, the polarization direction of the laser beam L2a may remain in the horizontal direction (Z direction). Subsequently, the high-reflection mirror M323 may reflect the laser beam L2a in the horizontal direction (Z direction). As a result, the polarization direction of the laser beam L2a may be converted into the vertical direction (Y direction). In this way, the polarization direction may be converted into a desired direction using a plurality of reflection mirrors.

Input-Side Beam Shape Adjusting Optical Unit

Figure 12:
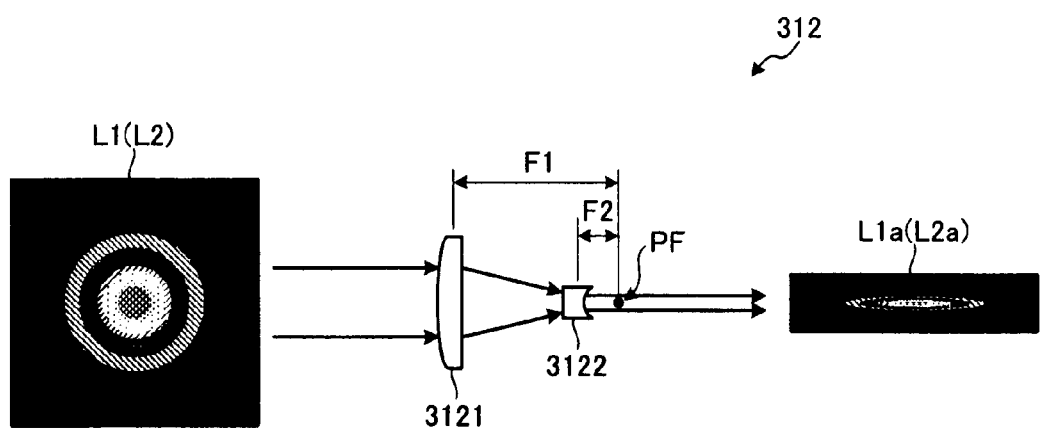
FIG. 12 illustrates an example of an input-side beam shape adjusting optical unit according to the first embodiment.

FIG. 12 illustrates an example of the beam shape adjusting optical unit 312 in the beam adjusting optical unit 31 disposed at the input side of the slab amplifier SA. As illustrated in FIG. 12, the beam shape adjusting optical unit 312 may include a cylindrical convex lens 3121 and a cylindrical concave lens 3122. The cylindrical convex lens 3121 may focus the laser beam L1 (L2) incident thereon on a focus PF distanced by a focal distance F1. The cylindrical concave lens 3122 may have the focus thereof lies on a position distanced by a focal distance F2. Here, making the focus of the cylindrical concave lens 3122 lie on the focus PF of the cylindrical convex lens 3121 may make it possible to convert the laser beam L1 (L2) focused by the cylindrical convex lens 3121 into a collimated laser beam (laser beam L1a (L2a)) having a beam profile elongated in one direction. Accordingly, disposing the cylindrical convex lens 3121 and the cylindrical concave lens 3122 so as to be inclined in the same direction as the slab amplifier SA may make it possible to convert the laser beam L1 (L2) having a circular beam profile into the laser beam L1a (L2a) having a beam profile elongated in the direction of the free-space axis AF of the slab amplifier SA. In this example, the input-side beam shape adjusting optical unit 312 may include a transmissive optical element. However, without being limited thereto, the beam shape adjusting optical unit 312 may include a reflective optical element. That is, in place of the cylindrical convex lens 3121, a cylindrical convex mirror or a cylindrical off-axis parabolic convex mirror may be used. Further, the beam shape adjusting optical unit 312 may be disposed at the output side of the slab amplifier SA, and the relative position of the cylindrical convex lens 3121 and the cylindrical concave lens 3122 may be reversed from the configuration thereof at the input side. With this, the beam shape adjusting optical unit 312 may be used as the beam shape adjusting optical unit 322 for converting the laser beam having a beam profile elongated in one direction to the laser beam having a circular beam profile.

Output-Side Beam Shape Adjusting Optical Unit

Figure 13:
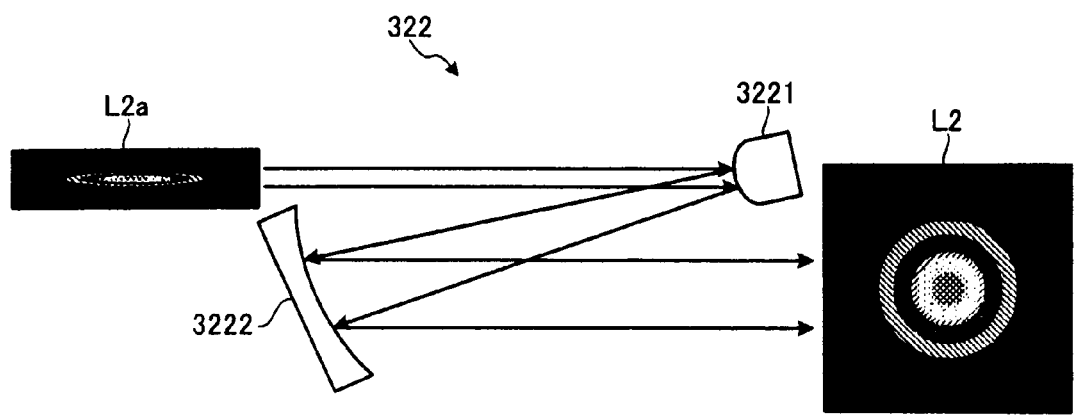
FIG. 13 illustrates an example of an output-side beam shape adjusting optical unit according to the first embodiment.

FIG. 13 illustrates the beam shape adjusting optical unit 322 in the beam adjusting optical unit 32 disposed at the output side of the slab amplifier SA. As illustrated in FIG. 13, the beam shape adjusting optical unit 322 may include a cylindrical convex mirror 3221 and a cylindrical concave mirror 3222. The cylindrical convex mirror 3221 may reflect the laser beam L2a incident thereon toward the cylindrical concave mirror 3222. At this time, the cylindrical convex mirror 3221 may reflect the laser beam L2a so that the beam profile will be elongated in a direction in which the beam profile of the laser beam L2a incident thereon is shorter. The cylindrical concave mirror 3222 may preferably be disposed at a position at which the beam profile of the laser beam L2a reflected by the cylindrical convex mirror 3221 is circular. The cylindrical concave mirror 3222 may reflect the laser beam L2a at this position, and thus the laser beam L2a may be converted into a collimated laser beam having a circular beam profile (laser beam L2). The beam shape adjusting optical unit 322 may be disposed at the input side of the slab amplifier SA, and the relative position of the cylindrical convex mirror 3221 and the cylindrical concave mirror 3222 may be reversed from the configuration at the output side. With this, the beam shape adjusting optical unit 322 may be used as the beam shape adjusting optical unit 312 for converting a laser beam having a circular beam profile into a laser beam having a beam profile elongated in one direction.

First Modification of Beam Shape Adjusting Optical Unit

Figure 14:
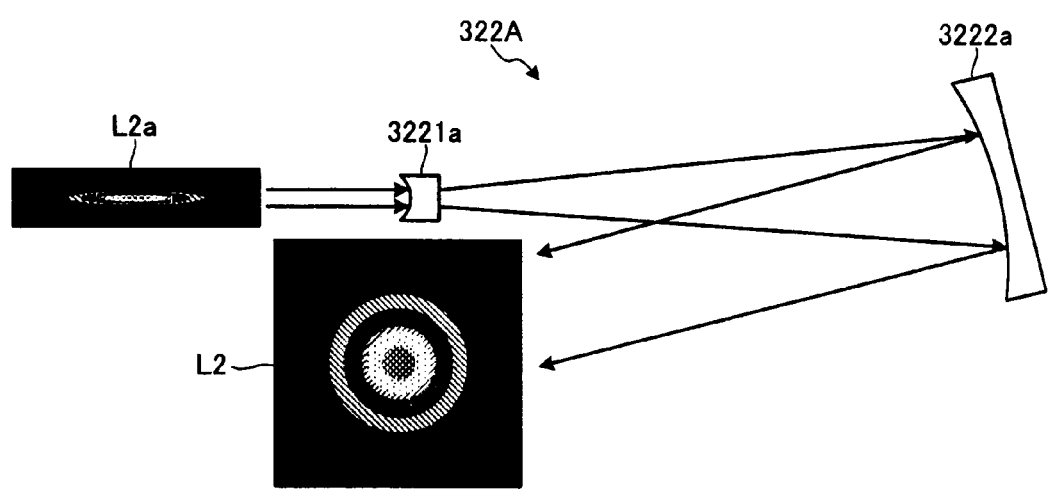
FIG. 14 illustrates a first modification of the beam shape adjusting optical unit.

FIG. 14 illustrates a first modification of the beam shape adjusting optical unit 322. As illustrated in FIG. 14, a beam shape adjusting optical unit 322A may include a cylindrical concave lens 3221a and a cylindrical concave mirror 3222a, which respectively differ in size from each other. The cylindrical concave lens 3221a may transmit the laser beam L2a incident thereon such that the beam profile thereof may be elongated in a direction in which the beam profile of the laser beam L2a incident thereon is shorter. The cylindrical concave mirror 3222a may preferably be disposed at a position at which the beam profile of the laser beam L2a transmitted through the cylindrical convex lens 3221a is circular. The cylindrical concave mirror 3222a may reflect the laser beam L2a at this position, and thus the laser beam L2a may be converted into a collimated laser beam having a circular beam profile (laser beam L2). The beam shape adjusting optical unit 322A may be disposed at the input side of the slab amplifier SA, and the relative position of the cylindrical convex lens 3221a and the cylindrical concave mirror 3222a may be reversed from the configuration at the output side, as in the beam shape adjusting optical unit 322 described above. With this, the beam shape adjusting optical unit 322A may be used as the beam shape adjusting optical unit 312 for converting a laser beam having a circular beam profile into a laser beam having a beam profile elongated in one direction.

Second Modification of Beam Shape Adjusting Optical Unit

Figure 15:
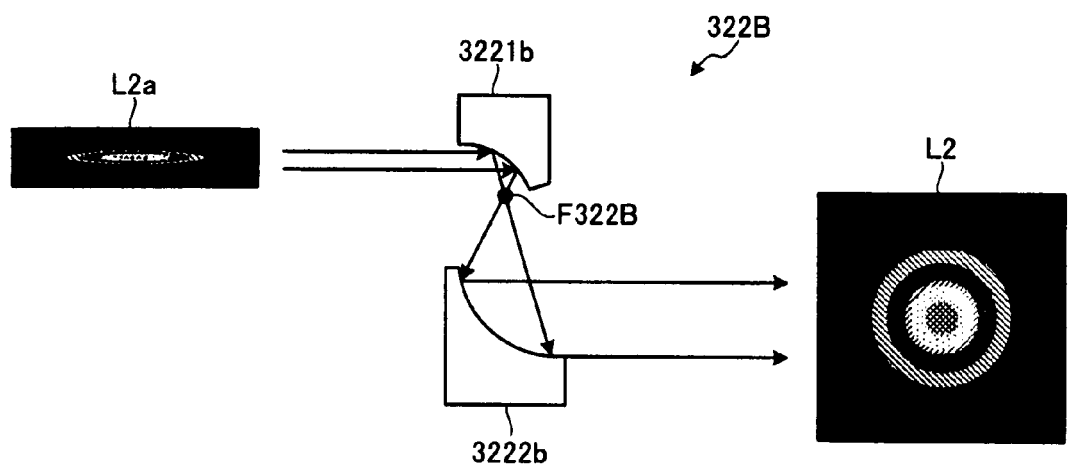
FIG. 15 illustrates a second modification of the beam shape adjusting optical unit.

FIG. 15 illustrates a second modification of the beam shape adjusting optical unit 322. As illustrated in FIG. 15, a beam shape adjusting optical unit 322B may include two cylindrical off-axis parabolic concave mirrors 3221b and 3222b disposed such that the respective reflective surfaces thereof face each other. The cylindrical off-axis parabolic concave mirror 3221b may reflect the laser beam L2a incident thereon such that the laser beam L2a is focused on a focus F322B. The cylindrical off-axis parabolic mirror 3222b may preferably be disposed at a position at which the focus thereof coincides with the focus F322B of the cylindrical off-axis parabolic mirror 3221b and at which the beam profile of the laser beam L2a having passed the focus F322B is circular. The cylindrical off-axis parabolic concave mirror 3222b may reflect the laser beam L2a at this position, whereby the laser beam L2a reflected thereby may be converted into a collimated laser beam having a circular beam profile (laser beam L2). The beam shape adjusting optical unit 322B may be disposed at the input side of the slab amplifier SA, and the relative position of the cylindrical off-axis parabolic concave mirrors 3221b and 3222b may be reversed from the configuration at the output side, as in the beam shape adjusting optical unit 322A described above. With this, the beam shape adjusting optical unit 322B may be used as the beam shape adjusting optical unit 312 for converting a laser beam having a circular beam profile into a laser beam having a beam profile elongated in one direction.

Third Modification of Beam Shape Adjusting Optical Unit

Figure 16:
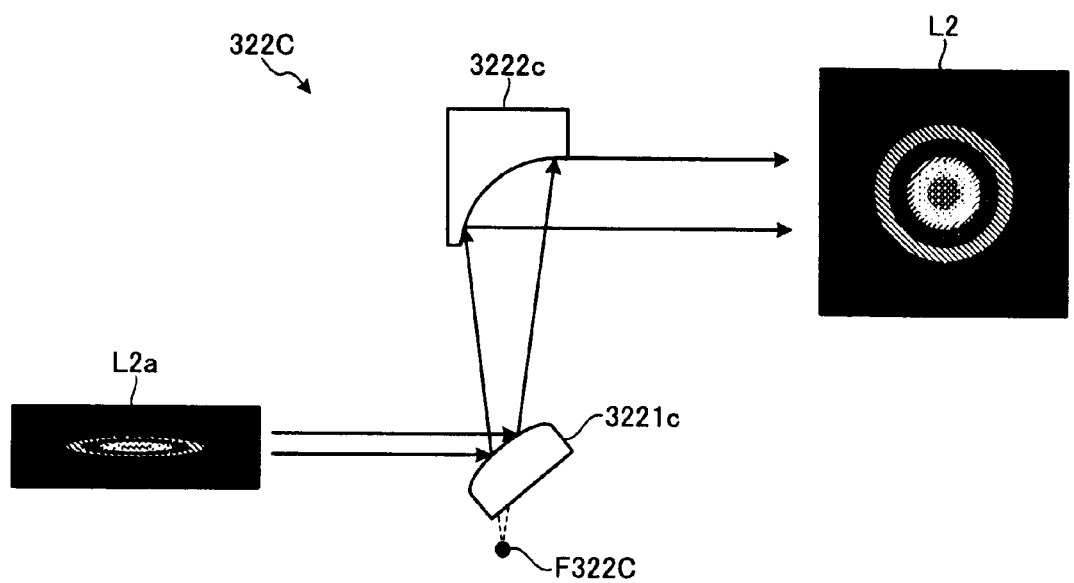
FIG. 16 illustrates a third modification of the beam shape adjusting optical unit.

FIG. 16 illustrates a third modification of the beam shape adjusting optical unit 322. As illustrated in FIG. 16, a beam shape adjusting optical unit 322C may be configured, for example, of a cylindrical off-axis parabolic convex mirror 3221c and a cylindrical off-axis parabolic concave mirror 3222c disposed such that the respective reflective surfaces thereof face each other. The cylindrical off-axis parabolic convex mirror 3221c may have a focus F322C to the side opposite of the reflective surface, and may reflect the laser beam L2a incident thereon such that the beam profile thereof may be elongated in a direction in which the beam profile of the laser beam L2 incident thereon is shorter. The cylindrical off-axis parabolic concave mirror 3222c may preferably be disposed at a position at which the focus thereof coincides with the focus F322C of the cylindrical off-axis parabolic convex mirror 3221c and at which the beam profile of the laser beam L2a reflected by the cylindrical off-axis parabolic convex mirror 3221c is circular. The cylindrical off-axis parabolic concave mirror 3222c may reflect the laser beam L2a at this position, whereby the laser beam L2a reflected by the cylindrical off-axis parabolic convex mirror 3221c may be converted into a collimated laser beam having a circular beam profile (laser beam L2). The beam shape adjusting optical unit 322C may be disposed at the input side of the slab amplifier SA, and the relative position of the cylindrical off-axis parabolic convex mirror 3221c and the cylindrical off-axis parabolic concave mirrors 3222c may be reversed from the configuration at the output side, as in the beam shape adjusting optical unit 322B described above. With this, the beam shape adjusting optical unit 322C may be used as the beam shape adjusting optical unit 312 for converting a laser beam having a circular beam profile into a laser beam having a beam profile elongated in one direction.

First Modification of Slab Amplification Device

Figure 17:
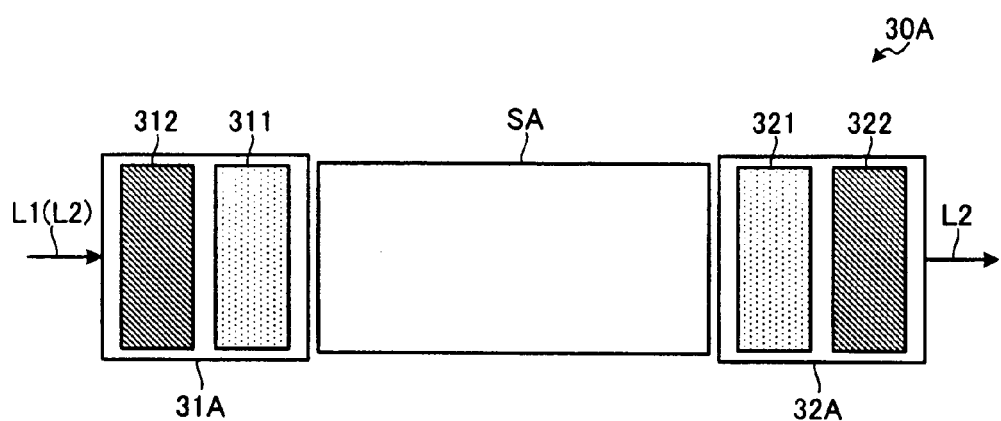
FIG. 17 illustrates a first modification of the slab amplification device.

A first modification of the slab amplification device 30 will be described. FIG. 17 illustrates a slab amplification device according to the first modification. A slab amplification device 30A shown in FIG. 17 may be similar in configuration to the slab amplification device 30 shown in FIG. 8, except in that the beam adjusting optical units 31 and 32 may be replaced by beam adjusting optical units 31A and 32A, respectively. The beam adjusting optical unit 31A may include the polarization direction adjusting optical unit 311 and the beam shape adjusting optical unit 312, as in the beam adjusting optical unit 31. However, the respective positions thereof may be switched. Similarly, the beam adjusting optical unit 32A may be similar in configuration to the beam adjusting optical unit 32; however, the respective positions of the beam shape adjusting optical unit 322 and of the polarization direction adjusting optical unit 321 may be switched. In this way, even when the positions of the polarization direction adjusting optical units 311 and 321 and of the beam shape adjusting optical units 312 and 322 are switched, respectively, similar effects may be obtained.

Second Modification of Slab Amplification Device

Figure 18:
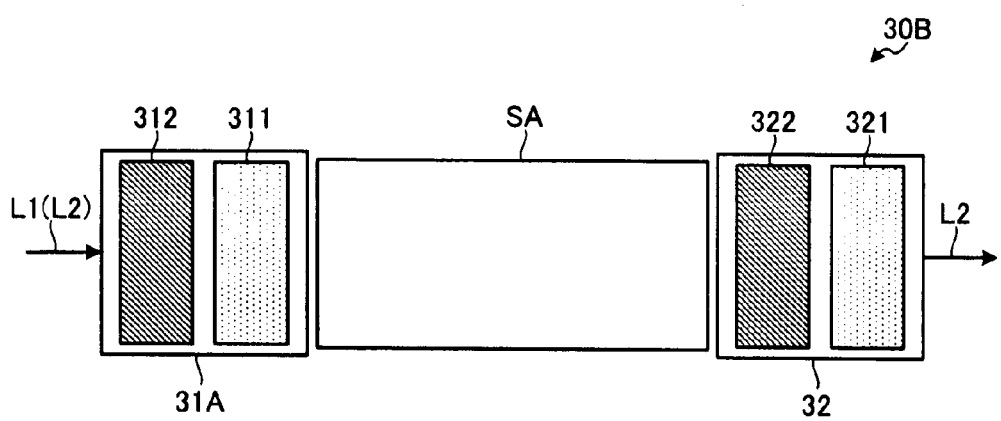
FIG. 18 illustrates a second modification of the slab amplification device.

FIG. 18 illustrates a slab amplification device according to a second modification. A slab amplification device 30B shown in FIG. 18 may be similar in configuration to the slab amplification device 30 shown in FIG. 8, except in that the beam adjusting optical unit 31 is replaced by the beam adjusting optical unit 31A. The beam adjusting optical unit 31A may be similar to the beam adjusting optical unit 31A of the first modification shown in FIG. 17. In this way, even when the positions of the polarization direction adjusting optical unit 311 (or 321) and of the beam shape adjusting optical unit 312 (or 322) in the beam adjusting optical unit 31 (or 32) are switched, similar effects may be obtained.

Third Modification of Slab Amplification Device

Figure 19:
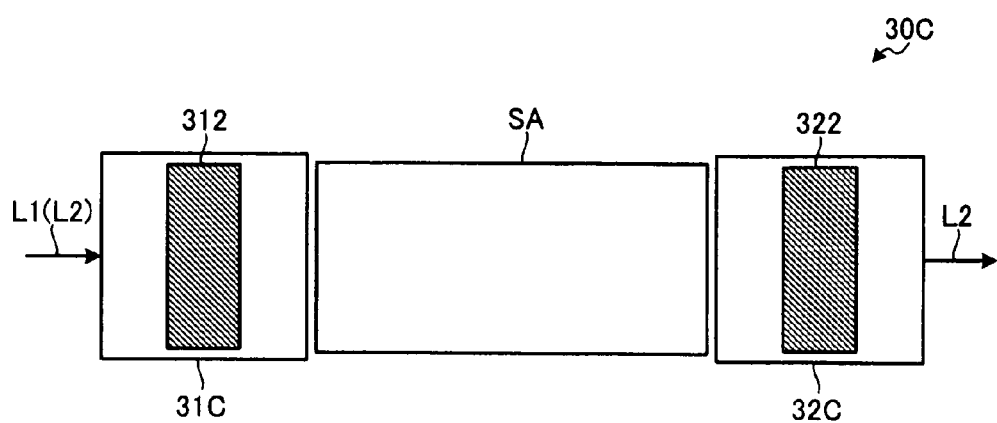
FIG. 19 illustrates a third modification of the slab amplification device.

FIG. 19 illustrates a slab amplification device according to a third modification. A slab amplification device 30C shown in FIG. 19 may be similar in configuration to the slab amplification device 30 shown in FIG. 8, except in that the beam adjusting optical units 31 and 32 are replaced by beam adjusting optical units 31C and 32C, respectively. In the beam adjusting optical unit 31C, the polarization direction adjusting optical unit 311 may be omitted from the configuration of the beam adjusting optical unit 31. Similarly, in the beam adjusting optical unit 32C, the polarization direction adjusting optical unit 321 may be omitted from the configuration of the beam adjusting optical unit 32. In this way, even only with the configuration for coinciding the lengthwise direction of the beam profile elongated in one direction with the direction of the free-space axis AF of the slab amplifier SA, the laser beam L1 (L2) may be amplified efficiently.

Fourth Modification of Slab Amplification Device

Figure 20:
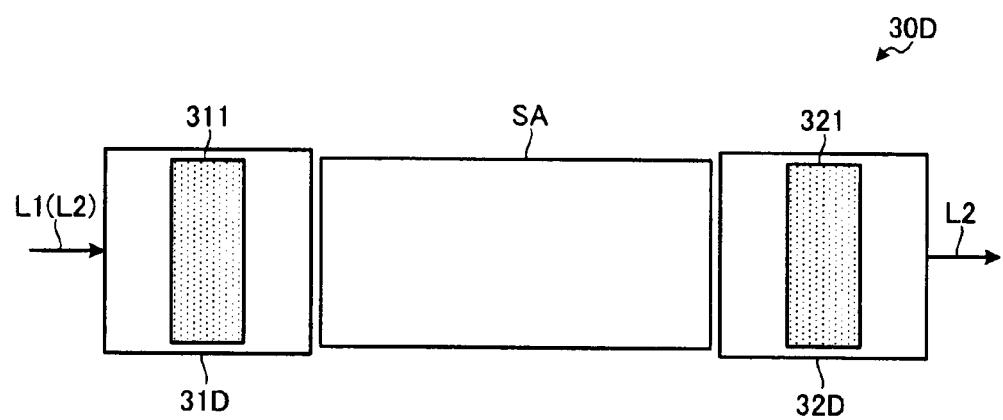
FIG. 20 illustrates a fourth modification of the slab amplification device.

FIG. 20 illustrates a slab amplification device according to a fourth modification. A slab amplification device 30D shown in FIG. 20 may be similar in configuration to the slab amplification device 30 shown in FIG. 8, except in that the beam adjusting optical units 31 and 32 is replaced by beam adjusting optical units 31D and 32D, respectively. In the beam adjusting optical unit 31D, the beam shape adjusting optical unit 312 may be omitted from the configuration of the beam adjusting optical unit 31. Similarly, in the beam adjusting optical unit 32D, the beam shape adjusting optical unit 322 may be omitted from the configuration of the beam adjusting optical unit 32. In this way, even only with the configuration for coinciding the polarization direction of the laser beam L1 (L2) entering into the slab amplifier SA with the direction of the free-space axis AF of the slab amplifier SA, the laser beam L1 (L2) may be amplified efficiently.

Fifth Modification of Slab Amplification Device

Figure 21:
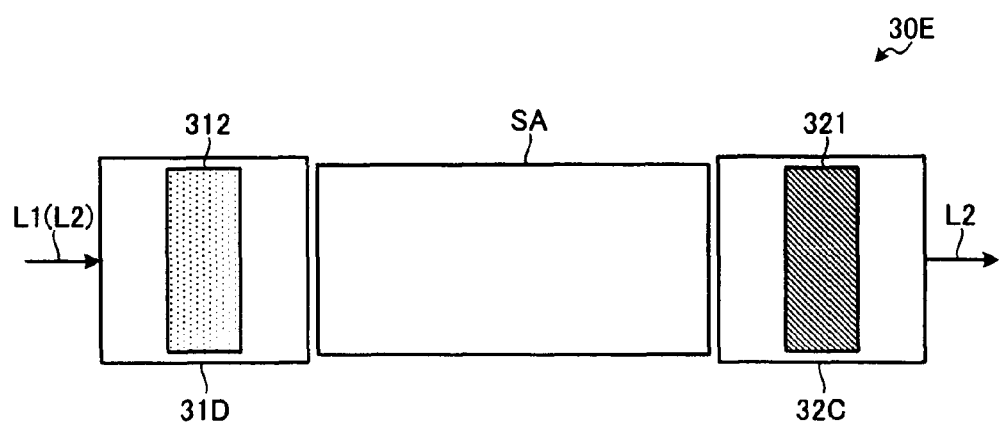
FIG. 21 illustrates a fifth modification of the slab amplification device.

FIG. 21 illustrates a slab amplification device according to a fifth modification. A slab amplification device 30E may be similar in configuration to the slab amplification device 30 shown in FIG. 8, except in that the beam adjusting optical units 31 and 32 is replaced respectively by the beam adjusting optical unit 31D (See FIG. 20) according to the fourth modification and the beam adjusting optical unit 32C (See FIG. 19) according to the third modification. In this way, the polarization direction of the laser beam entering the slab amplifier SA may coincide with the direction of the free-space axis AF of the slab amplifier SA and the beam profile of the laser beam outputted from the slab amplifier SA may be suitable for the optical units disposed downstream of the slab amplification device 30E.

Second Embodiment

A second embodiment of this disclosure will be described in detail with reference to the drawings. In the description to follow, configurations similar to those of the first embodiment or the modifications thereof will be referenced by similar referential symbols and the duplicate descriptions thereof will be omitted.

Figure 22:
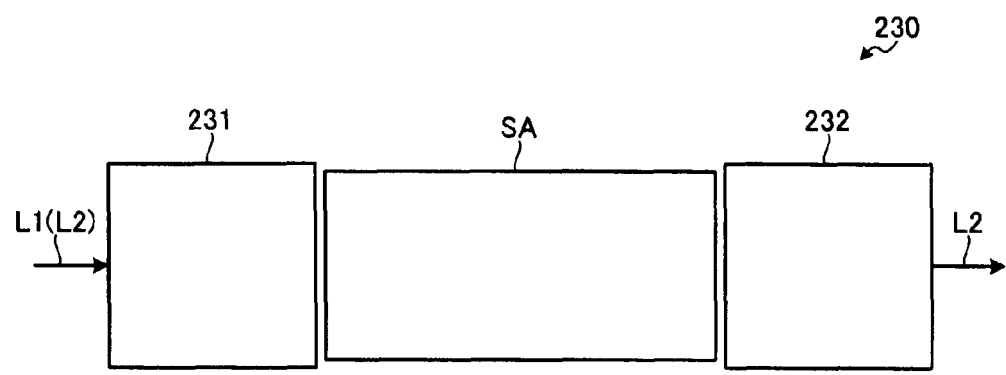
FIG. 22 illustrates an example of a slab amplification device according to a second embodiment.

FIG. 22 illustrates an example of a slab amplification device according to the second embodiment. As illustrated in FIG. 22, a slab amplification device 230 may be similar in configuration to the slab amplification device 30 shown in FIG. 2, for example, except in that the beam adjusting optical units 31 and 32 is replaced by beam adjusting optical units 231 and 232, respectively.

Figure 23:
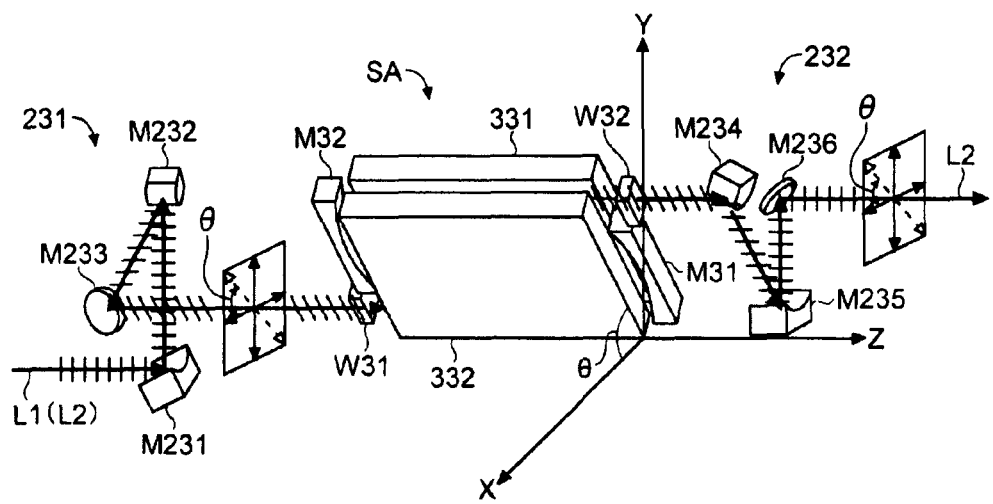
FIG. 23 illustrates a specific example of the beam adjusting optical unit shown in FIG. 22.

The beam adjusting optical unit 231 may be equipped with the functions of the polarization direction adjusting optical unit 311 and of the beam shape adjusting optical unit 312 in the beam adjusting optical unit 31. Similarly, the beam adjusting optical unit 232 may be equipped with the functions of the beam shape adjusting optical unit 322 and the polarization direction adjusting optical unit 321 of the beam adjusting optical unit 32. Referring to FIG. 23, a specific example of the beam adjusting optical units 231 and 232 will be described.

As illustrated in FIG. 23, the input-side beam adjusting optical unit 231 may include a cylindrical concave mirror M231, a cylindrical convex mirror M232, and a high-reflection mirror M233. The linearly polarized laser beam L1 (L2), the polarization direction of which may be vertical, for example, may enter the beam adjusting optical unit 231 in the horizontal direction (Z direction). The cylindrical concave mirror M231 may reflect the laser beam L1 (L2) incident thereon in the vertical direction (Y direction). With this, the beam profile of the laser beam L1 (L2) may be converted into a beam profile elongated in Z direction, and the polarization direction of the laser beam L1 (L2) may be in the horizontal direction (Z direction). Then, the cylindrical convex mirror M232 may reflect the laser beam L1 (L2) in a direction of the inclination (θ) of the slab amplifier SA. At this time, the laser beam L1 (L2) may be collimated. Note that the polarization direction of the laser beam L1 (L2) may remain in the horizontal direction (Z direction). Subsequently, the high-reflection mirror M233 may reflect the laser beam L1 (L2) in the horizontal direction (Z direction). As a result, the laser beam L1a (L2a), of which the beam profile is elongated in a direction of the inclination (θ) of the slab amplifier SA and the polarization direction coincides with the direction of the inclination (θ) of the slab amplifier SA, may enter the slab amplifier SA. Here, the cylindrical concave mirror M231 and the cylindrical convex mirror M232 may respectively be replaced by a cylindrical off-axis parabolic concave mirror and a cylindrical off-axis parabolic convex mirror.

As illustrated in FIG. 23, the output-side beam adjusting optical unit 232 may include a cylindrical convex mirror M234, a cylindrical concave mirror M235, and a high-reflection mirror M236. The laser beam L2a outputted from the slab amplifier SA may first be reflected by the cylindrical convex mirror M234. The cylindrical convex mirror M234 may reflect the laser beam L2a in a direction of the inclination (θ) of the slab amplifier SA. With this, the beam profile of the laser beam L2a may be circular, and the polarization direction of the laser beam L2a may be horizontal (Z direction). Then, the cylindrical concave mirror M235 may reflect the laser beam L2a in the horizontal direction (Z direction). The cylindrical concave mirror M235 may be disposed at a position at which the beam profile of the laser beam L2a reflected by the cylindrical convex mirror M234 is circular. The laser beam L2a, reflected by the cylindrical concave mirror M235, may be converted into a collimated laser beam having a circular beam profile. Here, the polarization direction of the laser beam L2a may remain in the horizontal direction (Z direction). Subsequently, the high-reflection mirror M236 may reflect the laser beam L2a in the horizontal direction (Z direction). As a result, the laser beam L2, of which the beam profile is circular and the polarization direction is in the vertical direction (Y direction), may be outputted. Here, the cylindrical convex mirror M234 and the cylindrical concave mirror M235 may respectively be replaced by a cylindrical off-axis parabolic convex mirror and a cylindrical off-axis parabolic concave mirror.

As described above, a beam adjusting optical unit equipped with a beam shape adjusting function and a polarization direction adjusting function may be implemented by combining a plurality of various mirrors. Other configurations, operations, and effects may be similar to those of the above-described embodiments and the modifications thereof, and thus detailed descriptions thereof will be omitted.

Third Embodiment

A third embodiment of this disclosure will be described in detail with reference to the drawings. In the description to follow, configurations similar to those of the first or second embodiment or the modifications thereof will be referenced by similar referential symbols and duplicate descriptions thereof will be omitted.

As in the EUV light generation system 100 shown in FIG. 1, for example, in a case where there are a plurality of slab amplifiers SA, the plurality of the slab amplifiers SA may be arranged in the direction of the free-space axis AF. This may lead to space-saving. Alternatively, in a case where the plurality of the slab amplifiers SA is arranged in the direction of the waveguide axis AW, a footprint of the system may be reduced. Hereinafter, the above case will be described as the third embodiment. Note that the description to follow will be based on the first embodiment.

Figure 24:
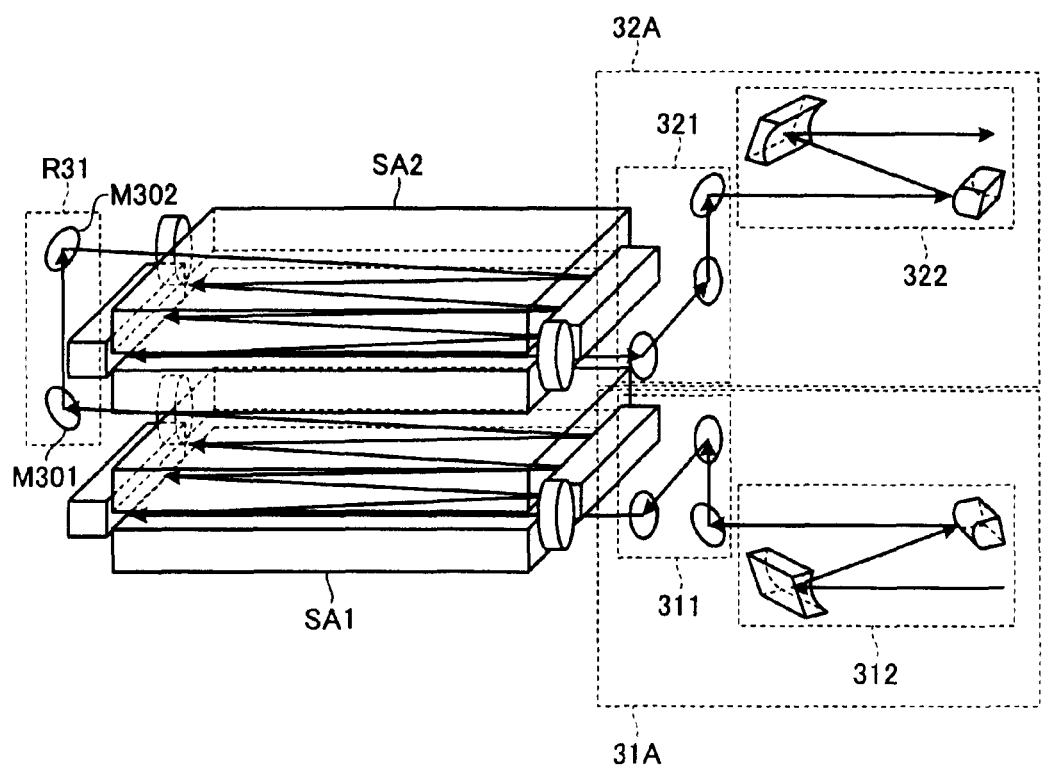
FIG. 24 illustrates an example of a slab amplification device according to a third embodiment.

The configuration of the slab amplification devices 30a and 30b shown in FIG. 1 may be replaced by the configuration shown in FIG. 24. In FIG. 24, two slab amplifiers SA1 and SA2 may be arranged in the direction of the waveguide axis AW. The respective free-space axes AF and the respective waveguide axes of the slab amplifiers SA1 and SA2 may be in parallel with each other. In FIG. 24, the lower-side slab amplifier SA1 may be disposed upstream in the beam path from the master oscillator 10 as the originating point. The beam adjusting optical unit 31A may be disposed at the input-side of the slab amplifier SA1, for example. However, without being limited thereto, any of the above-described beam adjusting optical units may be disposed at the input-side of the slab amplifier SA1.

In FIG. 24, the upper-side slab amplifier SA2 may be disposed downstream in the beam path. The beam adjusting optical unit 32A may be disposed at the output-side of the slab amplifier SA2, for example. However, without being limited thereto, any of the above-described beam adjusting optical units may be disposed at the output-side of the slab amplifier SA2.

A relay optical system R31 may be provided on the beam path between the slab amplifier SA1 and the slab amplifier SA2, and the laser beam outputted from the slab amplifier SA1 may enter the slab amplifier SA2 via the relay optical systems R31. The relay optical system R31 may include two high-reflection mirrors M301 and M302, for example.

In this way, arranging the plurality of the slab amplifiers SA such that the respective free-space axes AF thereof and the respective waveguide axes AW thereof are in parallel with each other may allow the laser beam outputted from the upstream-side slab amplifier SA to enter the downstream-side slab amplifier SA without a beam adjusting optical unit. As a result, the output-side beam adjusting optical unit of the upstream-side slab amplifier SA may be omitted, and the configuration may be simplified.

In the above embodiment, the relay optical system R31 may include the two high-reflection mirrors M301 and M302. However, this disclosure is not limited thereto. For example, the high-reflection mirrors M301 and M302 may be replaced by a concave mirror, an off-axis parabolic mirror, and so forth, respectively. Other configurations, operations, and effects may be similar to those of the above-described embodiments and the modifications thereof; thus, detailed descriptions thereof will be omitted.

The above-described embodiments and the modifications thereof are merely examples for implementing this disclosure, and this disclosure is not limited thereto. Making various modifications according to the specifications or the like falls within the scope of this disclosure, and it is apparent from the above description that other various embodiments are possible within the scope of this disclosure. For example, it goes without saying that the modifications illustrated for each of the embodiments can be applied to other embodiments as well.

The terms used in this specification and the appended claims should be interpreted as "non-limiting." For example, the terms "include" and "be included" should be interpreted as "not limited to the stated elements." The term "have" should be interpreted as "not limited to the stated elements." Further, the modifier "one (a/an)" should be interpreted as "at least one" or "one or more."

What is claimed is:

1. A slab amplification device, comprising:
    at least one slab amplifier; and
    at least one beam adjusting optical unit disposed at least either one of an input side and an output side of the at least one slab amplifier, wherein
    the at least one beam adjusting optical unit is configured to convert at least one of a polarization direction and a beam profile of a laser beam inputted thereto and output the converted laser beam:
    the at least one beam adjusting optical unit includes a first beam adjusting optical unit, and the first beam adjusting optical unit is disposed at the input side of the at least one slab amplifier; and
    a free-space axis parallel to discharge electrodes of the at least one slab amplifier is defined in the at least one slab amplifier,
    the first beam adjusting optical unit includes at least one polarization direction adjusting optical unit and at least one beam shape adjusting optical unit,
    the at least one polarization direction adjusting optical unit is configured to convert the polarization direction of the laser beam inputted thereto such that the polarization direction substantially coincides with a direction of the free-space axis and output the converted laser beam, and
    the at least one beam shape adjusting optical unit is configured to convert the beam profile of the laser beam inputted thereto such that the beam profile is elongated in a direction of the free-space axis and output the converted laser beam.

2. The slab amplification device according to claim 1, wherein the at least one beam adjusting optical unit includes a second beam adjusting optical unit, and the second beam adjusting optical unit is disposed at the output side of the at least one slab amplifier.

3. The slab amplification device according to claim 2, wherein
    the second beam adjusting optical unit includes at least one polarization direction adjusting optical unit and at least one beam shape adjusting optical unit,
    the at least one polarization direction adjusting optical unit is configured to convert the polarization direction of the laser beam inputted thereto to a predetermined direction and output the converted laser beam, and
    the at least one beam shape adjusting optical unit is configured to convert the beam profile of the laser beam inputted thereto to a predetermined shape and output the converted laser beam.

4. The slab amplification device according to claim 1, wherein
    the slab amplification device further comprises a plurality of slab amplifiers including the at least one slab amplifier, and
    the plurality of the slab amplifiers is disposed such that the free-space axes of the respective slab amplifiers are in parallel to one another and such that axes orthogonal to the free-space axes of the respective slab amplifiers are in parallel to one another.

5. The slab amplification device according to claim 1, wherein
    the at least one polarization direction adjusting optical unit includes at least one of a quarter-wave plate, a half-wave plate, and a plurality of high-reflection mirrors.

6. The slab amplification device according to claim 1, wherein
    the at least one beam shape adjusting optical unit includes at least one of a cylindrical concave mirror, a cylindrical convex mirror, a cylindrical concave lens, a cylindrical convex lens, a cylindrical off-axis parabolic concave mirror, and a cylindrical off-axis parabolic convex mirror.

7. A laser apparatus, comprising:
    a master oscillator; any one of the slab amplification devices according to claims 1, 2, 3, 4, 5, and 6, to which a laser beam outputted from the master oscillator is inputted; and
    an amplifier for amplifying the laser beam outputted from the slab amplification device.

8. An extreme ultraviolet light generation system, comprising the laser apparatus according to claim 7.

* * * * *